United States Patent [19]

Haines

[11] Patent Number: 4,891,175
[45] Date of Patent: Jan. 2, 1990

[54] GAMES RACKET

[75] Inventor: Robert C. Haines, Huddersfield, United Kingdom

[73] Assignee: Dunlop Limited, United Kingdom

[21] Appl. No.: 165,292

[22] Filed: Mar. 8, 1988

[30] Foreign Application Priority Data

Mar. 17, 1987 [GB] United Kingdom ................ 8706234

[51] Int. Cl.$^4$ ............................................. A63B 51/10
[52] U.S. Cl. .................................. 264/154; 264/221; 264/317; 264/278; 273/73 C; 273/73 D
[58] Field of Search ................ 273/73 C, 73 D, 73 F, 273/73 K, 73 H; 264/272.15, 273, 277, 278, 154, 156, 221, 317; 425/467, 468, 469, 460

[56] References Cited

U.S. PATENT DOCUMENTS

| 881,266 | 3/1908 | Thompson et al. | 273/73 J |
|---|---|---|---|
| 1,937,787 | 12/1933 | Robinson | 273/73 H |
| 2,683,899 | 7/1954 | Reichenbach | 425/468 |
| 3,556,524 | 1/1971 | Carlton | 273/73 C |
| 3,972,974 | 8/1976 | Pico | 264/273 |
| 4,291,574 | 9/1981 | Frolow | 273/73 C X |
| 4,297,308 | 10/1981 | Popplewell | 273/73 C X |
| 4,343,757 | 8/1982 | Popplewell | 425/468 |
| 4,440,392 | 4/1984 | Popplewell | 273/73 C |
| 4,614,627 | 9/1986 | Curtis et al. | 264/46.6 |

FOREIGN PATENT DOCUMENTS

| 798744 | 11/1968 | Canada | 273/73 H |
|---|---|---|---|
| 1166078 | 10/1969 | United Kingdom | 273/73 H |
| 1198800 | 7/1970 | United Kingdom | 273/73 H |
| 1278474 | 6/1972 | United Kingdom | 273/73 D |

Primary Examiner—Edward M. Coven
Assistant Examiner—William E. Stoll
Attorney, Agent, or Firm—Stevens, Davis, Miller & Mosher

[57] ABSTRACT

The invention relates to a method of making a hollow frame for a games racket by injection moulding of fibre-reinforced thermoplastics material around a fusible core. The core is formed with holes through it corresponding to the desired stringing holes. The core holes are stepped so that the hole in one face of the core is larger than the hole in the opposite face. A stepped mould pin is inserted through each hole through the core, the pins being of such dimensions that the bore of the larger hole is completely filled giving positive location but the bore of the smaller hole is of greater diameter than that of its corresponding portion of the pin. Injection of the thermoplastics material, followed by setting of that material and then removal of the core results in a product having reinforcing tubular projections inwardly from one wall of the hollow frame.

6 Claims, 2 Drawing Sheets

GAMES RACKET

This invention relates to rackets for use in games, for example tennis, squash and badminton and is particularly concerned with the construction of the frames of these rackets and their method of manufacture.

In assignee's U.K. Pat. No. 2,015,886 we have described and claimed a games racket frame in which the frame comprises a head and a shaft, at least the head being a hollow injection moulding of thermoplastics material reinforced with short filament reinforcing material, in which the wall of the moulding which lies at the outer circumference of the head is joined to the wall which lies at the inner circumference of the head by an internal support means and the stringing holes in the head pass through the support means, the walls and support means of the moulding being integrally-formed. By "thermoplastics material reinforced with short filament reinforcing material" is meant a reinforced thermoplastics material in which the reinforcements are in the form of short discrete lengths of fibre-reinforcing material randomly dispersed in the thermoplastics resin matrix.

The racket constructions so described in 2,015,886 are a significant step forward in that they provide the first really successful commercial rackets of hollow frame construction made by an injection moulding technique. The hollow frame is reinforced by integrally-moulded internal support means—usually in the form of pillars—joining the outer wall to the inner wall of the head of the frame. These pillars support the walls and provide strength in the moulded product to resist the considerable forces exerted on the hollow frame, particularly by the tension of the racket strings. The total force exerted by the strings on the hollow frame can be considerable, e.g. up to a total of 500 Kg force in the two perpendicular directions of the strings, i.e. longitudinal and transverse string directions.

In 2,015,886 we have also described and claimed a method of making such hollow games racket frames by injection-moulding around a fusible metal core. The method in essence comprises forming at least the head by injecting a thermoplastics material around a fusible core, the core having a melting point below the injection temperature and being shaped to provide internal support means between that wall of the moulding that is to lie at the outer circumference of the head and that wall of the moulding that is to lie at the inner circumference of the head, allowing the moulding to set and then raising the temperature to an amount sufficient to melt the core but insufficient to melt or deform the moulding. In a preferred embodiment the internal support means is made in the form of a centrally-disposed row of hollow pillars which is made by positioning pins in the injection mould to pass through holes formed in the core, the pins being of smaller diameter than the holes.

In order to assist the positive location of the core in its desired position and to resist its being displaced from that position by the pressures of the injected plastics material, it has been found in this method to be advisable to use mould locating pins in the shoulder and crown areas of the frame, these locating pins passing through holes through the core which they completely fill.

It will be appreciated that it is important that the core be positively located in its desired position in the mould during injection, otherwise undesirably variable wall thickness of the product may result.

Our European Patent Application No. 85304470.9 (Publication No. 0 168,992) describes similar hollow injection-moulded racket frames but in which the moulded racket frames of reinforced thermoplastics material may be made without internal support pillars passing through the frame from the outer to the inner wall so that improved moulding techniques may be employed.

In such frames the internal support means may be opposed pairs of tubular projections, projecting internally of the frame towards each other but not of sufficient length to meet. These pairs of projections can conveniently be integrally-formed during the moulding step by utilizing a stepped mould pin through the fusible core for each pair, the mould pin being of such dimensions as to completely fill its core hole for a central portion of its length. This length then corresponds to the gap between the opposed projections in the product.

This system of mould pins, tightly fitting their respective core holes, has advantages, in that:

(a) both tubular projections of each pair are formed by a single pin and the pin is therefore withdrawn in one direction,
(b) the series of tightly located pins gives positive core location at each hole, giving excellent resistance to the injection pressure.

Thus the technique of our European Patent Application No. 85304470.9 can enable products of very uniform wall thickness to be achieved and this can enable thinner-walled products to be made to a higher standard of uniformity. Further this can enable lighter products to be made which can be of considerable significance for rackets.

However, this improved moulding technique results in the need to accurately locate as a tight fit in their mould positions each of up to sixty-four or more mould pins around the head loop shape. This can sometimes be a little difficult to achieve readily and may on occasions require some time to arrange. We have, therefore, now devised a means of making by injection moulding, reinforced thermoplastics hollow racket frames in which good positive location of the mould core is possible while utilizing a mould pin system that is easy to locate in its desired positions relative to the core.

Accordingly, in one aspect, the invention provides a method of making a frame for a games racket, the frame comprising a hollow head and a shaft, which method comprises the following steps:

forming a fusible core with holes through it corresponding to the locations of the desired stringing holes in the inner and outer circumference walls of the head, placing the core in a mould, inserting mould pins into the holes through the core, injecting thermoplastics material reinforced with short filament reinforcing material, as herein defined, around the core, allowing the thermoplastics material to set, raising the temperature sufficiently to melt the core without melting or distorting the moulding, and removing the molten core material, the core having a melting point below the injection temperature, in which the holes through the core are stepped so that the hole in one face is larger than the hole in the opposite face and the mould pins are stepped so that the bore of the larger hole is completely filled by its pin but the bore of the smaller hole is of greater diameter than that of its corresponding portion of its pin, whereby a tubular projection is formed defining and extending inwardly from each smaller hole only.

Normally, the tubular projections will all be formed to extend from one wall only of the frame, i.e. the smaller holes will all be in one face of the core and the larger holes all in the opposite face. The pin and core arrangement used in this invention gives positive location at each hole but is not so demanding on tolerances for fitment of all the pins through their holes in the core. It, therefore, optimizes the advantages of positive location and ease of mould handling.

The invention also results in a novel product and so in another aspect provides a games racket frame in which the frame comprises a head and a shaft, at least the head being a hollow injection moulding of thermoplastics material reinforced with short filament reinforcing material, as herein defined, which contains integrally-moulded stringing holes, the holes being in opposed pairs, one being larger than the other, one of each pair being in the wall of the moulding which lies at the inner circumference of the head and the second of each pair being in the wall of the moulding which lies at the outer circumference of the head, each smaller hole of each pair being defined by an integrally moulded tubular projection or apertured boss which projects inside the hollow frame towards the opposite wall.

In another aspect the invention provides a games racket comprising a strung frame of the type of the immediately preceding paragraph.

Thus the racket frame is provided with strengthening means extending inside the hollow frame. As indicated above, normally they will extend from either the inner circumference wall of the head only or from the outer circumference wall of the head only. Preferably they all extend from the wall corresponding to the inner circumference of the head.

The edges of the holes from which no tubular projections extend may be radiused to provide guidance for the passage of racket strings and to protect them from sharp edges but in a preferred embodiment each such hole will be filled with a grommet and, preferably, the grommet will be shaped to extend within the hole so as to rest on the facing end of the tubular projection from the opposite wall. This embodiment may be particularly advantageous in that reinforcing grommets can be used whereby load imposed on the frame can be additionally resisted by being transmitted via the grommet to the tubular projection.

The grommets may be of any suitable material, some being very well known in the art and may be separate or formed as continuous grommet strips.

The overall size of the tubular projections in order to provide adequate strength will of course depend on the type of racket frame in question, e.g. whether for tennis, badminton or squash, and will also depend on the wall thickness used, this again being determined by the envisaged use of the frame. The average skilled man of the art will readily be able to determine sizes satisfactory for his purpose but the dimensions given below with reference to the accompanying drawings may be considered illustrative by way of exemplification for a tennis racket frame.

The minimum length of the tubular projections inside the hollow frame is, again, a matter to be determined by the skilled man to suit his particular requirements, e.g. of strength and weight. However, it is preferred that the projections should extend for at least half of the distance between the inner circumference and outer circumference walls. The maximum length will of course be governed by that distance since the projections should not protrude beyond the far wall.

The racket frames of the invention are preferably moulded from reinforced polyamide although other thermoplastics polymer material may be used, e.g. polycarbonate, acrylonitrile-butadiene-styrene (ABS), acetal resin and so-called "modified poly(phenylene oxide)" (PPO) may be used.

The thermoplastics material used is preferably reinforced with from 10% to 40% by weight of carbon fibres based on total weight of the reinforced matrix. Alternatively glass or aromatic polyamide (e.g. KEVLAR—registered Trade Mark) fibres may be used or mixtures of any of these reinforcing fibres may be used.

The transverse sectional shape of the frame may be any desired shape, for example circular, oval or rectangular.

The latter may be preferred as its box-like section can give very high stiffness and strength-to-weight ratios. If it is desired, a longitudinally-extending groove or channel may be formed in the outer face of the wall of the frame which is to lie on the outer circumference of the head. The strings of the racket may then be recessed in this groove to safeguard them from abrasion. The transverse sectional shapes referred to above, therefore, include those shapes when modified by incorporation of such a groove or channel.

The invention is further illustrated by reference to the accompanying drawings in which.

Figure 1:
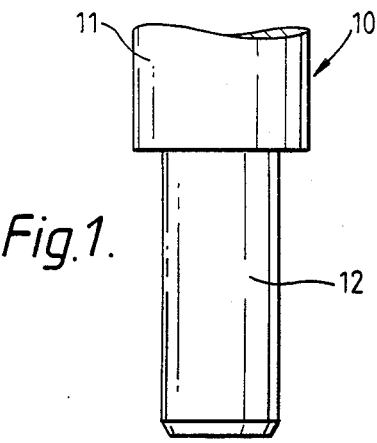
FIG. 1 is an elevation of a pin used to form a hole through the fusible core.

It will be appreciated that the portion of mould, core and frame shown in the drawings is shown in straight line for convenience rather than in its actual curved form corresponding to the loop of the head.

The formation of one pair of stringing holes is illustrated; this will of course be repeated around the head of the frame as required.

In FIG. 1, a stepped core pin 10 comprises two portions, a wider bore portion 11 and a longer, narrower bore portion 12. Pins of this shape are used in the manufacture of a cast fusible core by techniques well known in the art so that a core is formed with a series of stepped bores through it.

Figure 2:
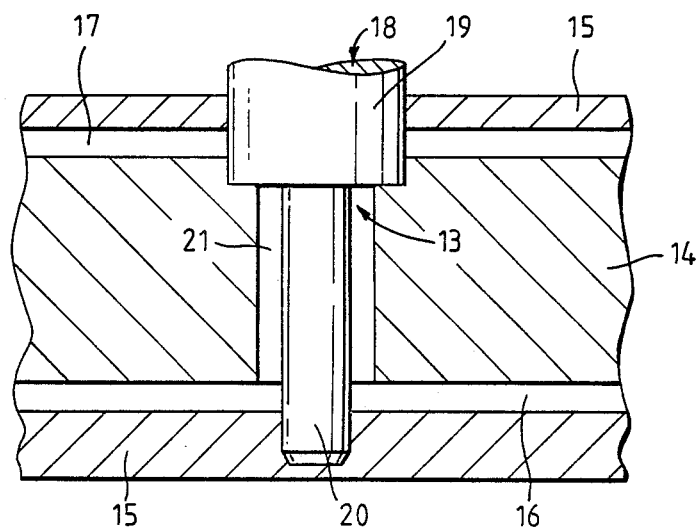
FIG. 2 is a diagrammatic representation in part-section of a portion of an injection mould containing a mould core with a mould pin in position in a desired stringing hole location.

FIG. 2 shows one such stepped bore 13 in a fusible core 14. Fusible core 14 is made having a configuration corresponding to the desired internal configuration of the eventual head of the racket. Stepped bore 13 is formed through the core at each desired stringing location.

Core 14 is placed in a suitable injection mould 15 and is spaced from the interior walls of the mould by conventional spacing means (not shown) to define gaps 16 and 17 corresponding to the desired walls at the inner circumference and outer circumference respectively of the head.

It will be seen that a stepped mould pin 18 is placed through each bore 13 of the core. Pin 18 has a wide bore portion 19 of dimensions corresponding to those of portion 11 of core pin 10 so that the bore 13 is completely filled in the region corresponding to what will eventually be the outer circumference wall of the frame. Pin 18 has a longer narrower portion 20 which corresponds to portion 12 of core pin 10 but is of smaller diameter. Hence a gap 21 exists around portion 20 between it and the core.

The extremity of portion 20 locates in a suitable recess in the wall of mould 15.

Injection of suitable reinforced thermoplastics material around the core then forms the desired frame.

Figure 3:
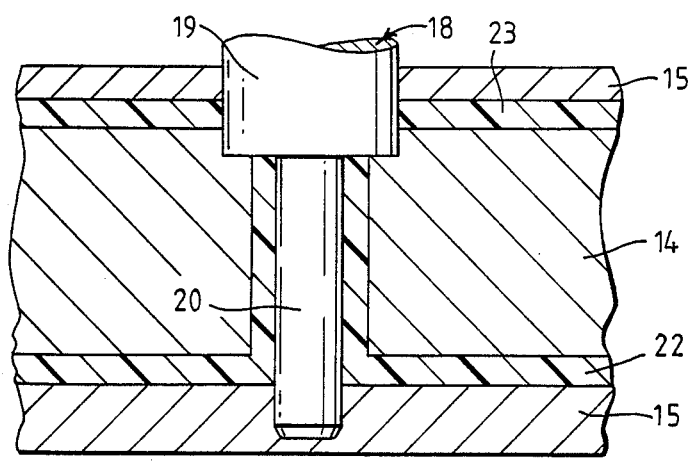
FIG. 3 is a similar view to that of FIG. 2 after thermoplastics material has been injected into the mould.

This stage is illustrated in FIG. 3 where inner circumference wall 22 and outer circumference wall 23 of the frame can be seen.

Figure 4:
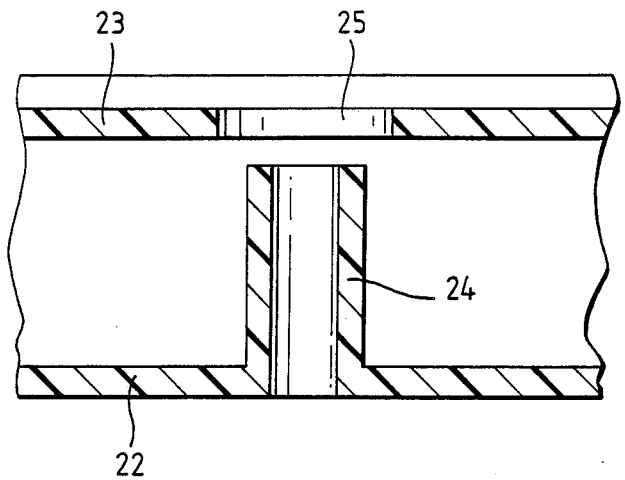
FIG. 4 is a section of a portion of racket frame after removal from the mould and removal of the fusible core.

When the frame has set, the mould pin can be removed and the fusible core can be melted out after removal of the moulding from the mould. This stage is shown in FIG. 4.

A tubular projection 24 has been formed on the inner wall 22 of the frame and extends towards but does not reach the larger bore hole 25 formed in the outer wall 23.

Figure 5:
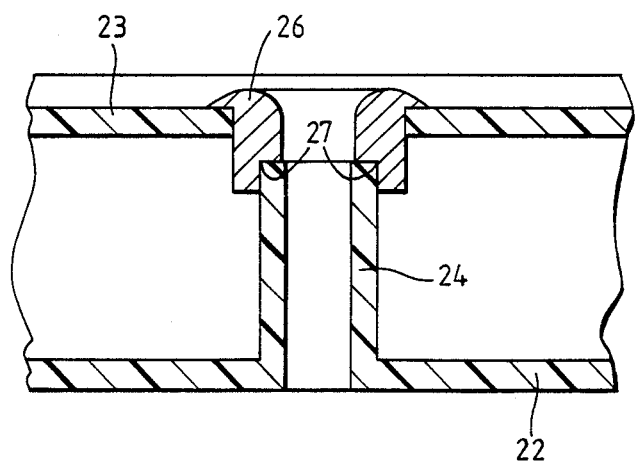
FIG. 5 is a similar view to that of FIG. 4 but showing the use of a grommet in the stringing hole.

FIG. 5 shows a similar product but with reinforcing grommet 26 in hole 25. The grommet is shaped with a stepped bore portion 27 to mate with the end of projection 24.

As an example of suitable dimensions for a tennis racket frame, the frame may have a wall thickness of 2.5 mm, the internal diameter of the tubular projection may be 2.5 mm and its length may be 6 mm including the wall thickness of the frame. The overall thickness of the section of the frame, i.e. from the inner circumference to the outer circumference of the head loop may be 10 mm and the transverse sectional width may be 15 mm.

In another embodiment the length of the tubular projection may be such that it extends across the entire gap inside the hollow frame between the inner circumference and outer circumference walls. Thus in the example above, it could be 7.5 mm long, i.e. 10 mm less the outer wall thickness of 2.5 mm. It will be appreciated that in order to mould this particular construction, the hole through the fusible core would not be stepped and the stepped mould pin would in effect 'sit' on the core with its narrower portion extending through the hole through the core.

It will also be appreciated that the fusible cores employed can conveniently be shaped so that the shaft and handle portion of the frame are formed as an integral moulding with the head. Shaft and handle shapes as desired can readily be formed but have not been described above as they can be designed as required by the skilled man of the art.

I claim:

1. A method of making a frame for a games racket, the frame comprising a hollow head and a shaft, said head being defined by inner and outer circumference walls and having stringing holes through said walls, which method comprises the following steps:
    forming a fusible core and forming stepped holes through said core corresponding to the locations of the stringing holes in the inner and outer circumference walls of the head, so that the hole in one face of the core is larger than the hole in the opposite face of the core,
    placing the core in a mould having inner and outer walls with holes of sizes corresponding to those of the core,
    forming mould pins that are stepped to have two different diameters on the same pin and inserting the mould pins into the holes through one of the walls of the mould and through the core so that the bore of the larger hole in the mould is completely filled by the larger diameter portion of a pin and that larger diameter contacts the fusible core to positively locate the core within the mould; the bore of the smaller hole in the core being of greater diameter than that of its corresponding portion of a pin, thus forming a stringing hole in one wall of the head that is larger than its corresponding hole in the opposite wall of the head so that it will form, when filled with molten material, a tubular projection integral with said opposite wall and extending toward said larger hole from the smaller hole and only partially across the width of the racket head between said inner and outer circumference walls,
    injecting thermoplastics material reinforced with short filament reinforcing material into said mould and around the core and allowing the thermoplastics material to set,
    raising the temperature sufficiently to melt the core without melting or distorting the moulding, and removing the molten core material, the core having a melting point below the injection temperature.

2. A method according to claim 14, in which the larger holes are all formed in one of said faces of the core and the smaller holes in the opposite face of the core.

3. A method according to claim 2, in which the larger holes are formed in the face of the core corresponding to the outer circumference of the head, whereby the tubular projections are formed extending from the inner circumference wall of the head.

4. A method according to claim 14, in which the edges defining the larger holes in the core are radiused.

5. A method according to claim 14, in which the smaller bore of the stepped holes extends through at least half the thickness of the core.

6. The method of claim 1 including forming the stepped hole in the fusible core and the larger diameter portion of the corresponding pin to sizes such that said larger diameter portion interfits into said stepped hole.

* * * * *